(12) United States Patent
Steicher et al.

(10) Patent No.: US 6,577,483 B1
(45) Date of Patent: Jun. 10, 2003

(54) DYNAMIC BRAKING METHOD AND APPARATUS

(75) Inventors: John T. Steicher, Ixonoa, WI (US); Gary R. Woltersdorf, West Bend, WI (US); Jeffrey M. Theisen, Cedarburg, WI (US); Jerry Dee Thunes, Greenfield, WI (US); John Joseph Golownia, Jr., Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 197 days.

(21) Appl. No.: 09/670,656

(22) Filed: Sep. 27, 2000

(51) Int. Cl.[7] ............................. H02H 3/20; H02P 7/04
(52) U.S. Cl. ........................................ 361/90; 318/370
(58) Field of Search .......................... 361/90, 91, 111; 187/108, 289, 296; 318/370, 371, 372, 376

(56) References Cited

U.S. PATENT DOCUMENTS

| | | | | |
|---|---|---|---|---|
| 4,093,900 A | * | 6/1978 | Plunkett | 318/370 |
| 4,667,776 A | * | 5/1987 | Nomura | 187/289 |
| 4,678,063 A | * | 7/1987 | Kitaoka et al. | 187/296 |

* cited by examiner

Primary Examiner—Rajnikant B. Patel
(74) Attorney, Agent, or Firm—Quarles & Brady; Alexander M. Gerasimow; William R. Walbrun

(57) ABSTRACT

An apparatus for decreasing speed of an inverter driven inertial load within a time period for use with a dynamic brake across a DC link including a controller for controlling the inverter to regulate the power returned to the brake such that, when a brake command is received, the power is increased during a power-up period while motor deceleration begins and up to a constant power level after which the constant power level is maintained by increasing torque such that the dynamic brake is fully used during the majority of a braking cycle and a method to accomplish the same.

21 Claims, 3 Drawing Sheets

DYNAMIC BRAKING METHOD AND APPARATUS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to dynamic braking of non-regenerative AC drives and more particularly to a method and an apparatus that facilitates drive braking to allow full use of a dynamic brake throughout essentially an entire braking cycle.

Power plants are linked to power consuming facilities (e.g., buildings, factories, etc.) via utility grids designed so as to be extremely efficient in delivering massive amounts of power. To facilitate efficient distribution, power is delivered over long distances as low frequency three-phase AC current.

Despite being distributable efficiently, low frequency AC current is not suitable for end use in consuming facilities. Thus, prior to end use power delivered by a utility has to be converted to a useable form. To this end a typical power "conditioning" configuration includes an AC-to-DC rectifier that converts the utility AC power to DC across positive and negative DC buses (i.e., across a DC link) and an inverter linked to the DC link that converts the DC power back to three phase AC power having an end useable form (e.g., three phase relatively high frequency AC voltage). A controller controls the inverter in a manner calculated to provide voltage waveforms required by the consuming facility.

Motors and linked loads are one type of common inductive load employed at many consuming facilities and, while the present invention is applicable to several different load types, in order to simplify this explanation an exemplary motor and load will be assumed. To drive a motor an inverter includes a plurality of switches that can be controlled to link and delink the positive and negative DC buses to motor supply lines. The linking-delinking sequence causes voltage pulses on the motor supply lines that together define alternating voltage waveforms. When controlled correctly, the waveforms cooperate to generate a rotating magnetic field inside a motor stator core. The magnetic field induces (hence the nomenclature "induction motor") a field in motor rotor windings. The rotor field is attracted to the rotating stator field and hence the rotor rotates within the stator core.

When selecting switches to configure an inverter several inverter requirements have to be considered. For example, among others, switching speed and power handling capabilities are extremely important switch selection considerations. With respect to power handling, given an expected maximum expected bus voltage inverter switches capable of handling the maximum DC voltage must be selected. Thereafter, during inverter operation, the DC bus voltage must be limited to an upper value below the maximum DC bus voltage to avoid destroying the switches.

One way to stop a motor and linked load is to cut off power to the inverter such that the stator field is eliminated. Without power the stator and rotor fields diminish and eventually the rotor slows and stops. While this stopping solution is suitable for some applications, this solution is unacceptable in other applications where motors have to be stopped relatively quickly.

To stop motors more quickly the controls industry has adopted several solutions. One widely used stopping technique is to control the inverter to provide a negative torque on the motor and cause an expedited linear deceleration. To this end, the inverter switches can be opened and closed in a controlled sequence calculated to have the stator field lag the rotor field. Because the rotor field is attracted to the stator field, the lagging stator field applies a reversing or negative torque on the rotor. When such a reversing torque is caused, the rotor and stator operate like a generator and, instead of drawing power from the DC bus, provide power back through the inverter switches to the DC bus. During transit back through the inverter switches some of the power is dissipated by the inverter as heat.

Some rectifier configurations are controlled such that power provided back to the DC bus can be provided back to the utility lines through the rectifier. These configurations are commonly referred to as "regenerative" drives as power is "regenerated" back to the supply.

The industry has developed numerous methods for maintaining the bus voltage level below the maximum level including (1) disabling the inverter (e.g., over voltage fault disablement), (2) extending the deceleration ramp and (3) using a power dissipating device (e.g., a dynamic brake). While each of these methods can be used to limit the DC bus voltage, each method has one or more shortcomings.

With respect to disabling the inverter, unfortunately, when the inverter is disabled motor control and the deceleration torque on the motor are disrupted. With respect to extending the deceleration ramp, extending the ramp results in an extended stopping period.

An exemplary dynamic brake includes a braking resistor, a switch, a switch controller and a DC bus voltage sensor. The switch and resistor are in series across the positive and negative DC buses and the switch is linked to the controller. The controller monitors the DC bus voltage via the sensor and, when the bus voltage exceeds a specified voltage limit, closes the switch. When the switch is closed, current passes through the resistor and the resistor dissipates power from the inverter.

Typical dynamic brake controllers control the brake switches in a hysteric fashion such that, if the specified voltage limit is 750V, after the switch is closed at 750V, that switch will remain closed until the DC bus voltage reaches some lower value (e.g., 735V). The range between the DC bus limit (e.g., 750V) and the lower hysteric value (e.g., 735V) is referred to hereinafter as a "brake hysteric range" or brake range DCR.

The peak power that the brake must absorb to limit the rise in bus voltage and avoid an over voltage trip during deceleration is one operating characteristic that must be considered when configuring a dynamic brake for a drive. For a rotating motor and load the stored energy is proportional to the square of the speed of rotation. Thus, during deceleration, the amount of power returned to the DC bus is highest (i.e., is at its peak) at the beginning of the deceleration period. During a typical linear deceleration the average power sent back to the DC bus is about one half of the peak power. Thus, the peak power exists for a very small amount of time and dynamic brakes are routinely underutilized during deceleration. This is because brakes must be designed to handle the peak power.

Even where system configurations include dynamic brakes, if power delivered back to the DC bus is excessive such that the braking resistor cannot dissipate sufficient power even when full on (i.e., when the switch is constantly closed), an over voltage fault may occur and the inverter protection feature will turn off the inverter to protect the inverter components. To this end, deceleration power is also proportional to the motor/load inertia such that a larger inertia will deliver more power to the DC bus than a relatively smaller inertia during deceleration.

To reduce the possibility of an over voltage condition many inverter drives include a regeneration power limit (RPL) or deceleration ramp rate that limits the power delivered to the DC bus during deceleration. Unfortunately, because DC link power is a function of motor/load inertia the optimum RPL or deceleration ramp varies as a function of system inertia and therefore the "optimum RPL or deceleration ramp" is only optimum under very specific conditions. In many applications the RPL or deceleration ramp is set via a trial and error commissioning procedure to accommodate the highest inertia associated with the motor/load which typically occurs when the motor/load is rotation at a maximum velocity. Where inertia changes (e.g., the load is changed or motor/load speed is altered), to maintain optimum operation, the RPL or deceleration ramp must be manually adjusted.

Therefore, there is a need for an inverter braking system that can stop a load (e.g., motor and connected load) within a given time period that requires a relatively small and inexpensive brake mechanism. It would also be advantageous to have such a system that does not require manual RPL or deceleration ramp adjustments to facilitate optimum operation.

BRIEF SUMMARY OF THE INVENTION

The present inventors have recognized that if the goal is to slow or stop a motor and mechanically couple load in a given time period without regard to deceleration linearity, a technique can be employed such that the power returned to the DC bus and therefore the dynamic brake is initially limited and can be kept essentially constant throughout a braking cycle. In this case, overall brake size in terms of current and power handling can be significantly reduced since sizing the brake for peak power is no longer required.

According to the present invention, with a motor/load running at an initial relatively high speed, after a deceleration command is received, a decelerating torque is applied to the motor increasing the DC bus voltage. When the bus voltage increases above the DCR level, the brake is 100% utilized (turned on 100% of the time). At this time the brake resistor is connected across the DC bus and is dissipating power at the brake maximum level. At this point the controller limits the decelerating torque to stop the increase of DC bus voltage and avoid a DC bus over voltage fault. As the motor/load speed decreases the decelerating torque can be proportionally increased to maintain a constant 100% utilized brake power. The decelerating torque can be increased until a drive torque, current or decelerating ramp limit is reached. When the limit is reached the brake power decreases dropping below the 100% utilization level. Since the dynamic brake is operating at constant 100% utilization throughout essentially the entire deceleration a significantly smaller (therefore lower cost) brake can be used for a given deceleration time.

Thus, one object of the invention is to provide an inverter braking mechanism wherein fast deceleration of an inverter-controlled load is accomplished with a reduced size brake mechanism. To this end, when a deceleration command is received, the inverter is operated to control the power to the brake and maintain the brake essentially full on over a majority portion of the deceleration period.

Another object of the invention is to eliminate the need for manual RPL or deceleration ramp adjustments. This object is accomplished by setting the DC bus voltage limit DCL such that the maximum DC bus voltage is limited irrespective of load characteristics. Thus, loads can be swapped and system inertia altered and the inventive control scheme automatically adjusts to provide optimum control (i.e., 100% brake utilization) and protection against a bus over voltage condition.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefor, to the claims herein for interpreting the scope of the invention.

DETAILED DESCRIPTION OF THE INVENTION

Figure 1:
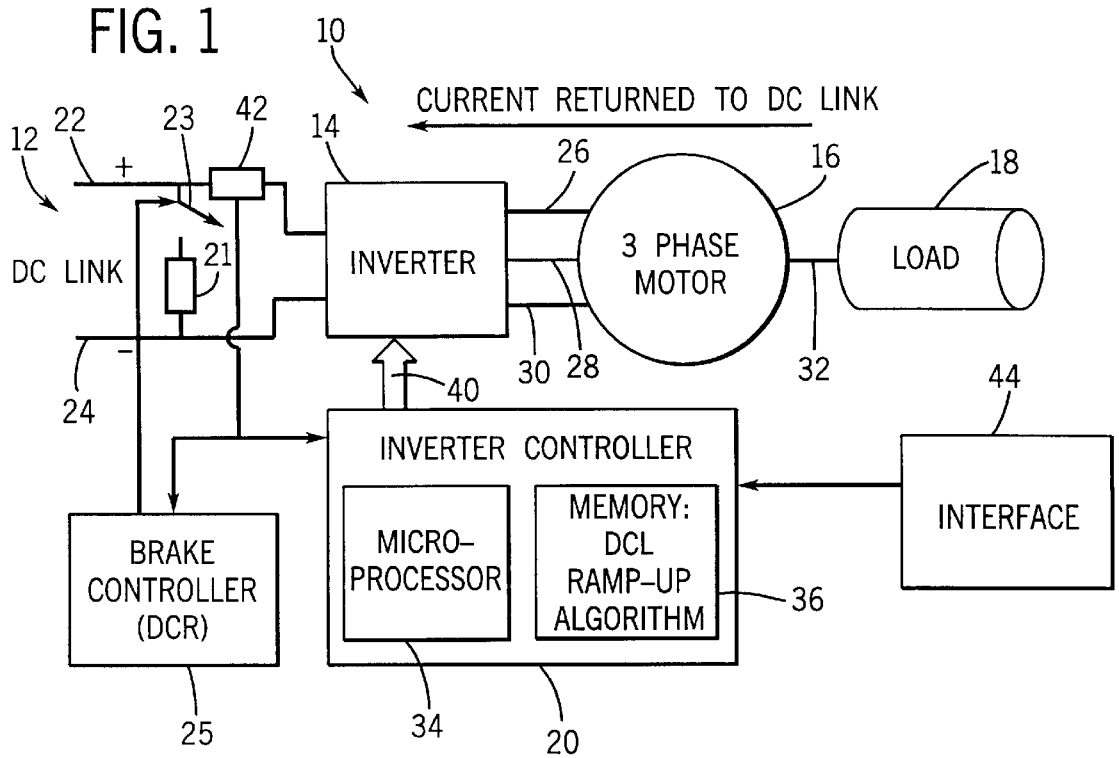
FIG. 1 is a schematic view of an exemplary motor control system according to the present invention.

Referring now to the drawings wherein like reference numbers correspond to similar components throughout the several views and, specifically, referring to FIG. 1, the present invention shall be described in the context of an exemplary motor control system 10. System 10 includes a DC link 12, an inverter 14, a three-phase motor 16, a load 18, an inverter controller 20, a braking resistor 21, a braking switch 23, a brake controller 25, an interface 44, a voltage sensor 42 and a plurality of lines and busses that link the aforementioned components together in the manner described hereinafter. Inverter 14 is positioned between positive and negative DC buses 22, 24, respectively, of DC link 12 and first, second, and third AC supply lines 26, 28, and 30, respectively. Although not illustrated, as well known in the motor controls industry, inverter 14 includes a plurality of switching devices (e.g., BJT's, etc.) that are positioned between the positive and negative DC buses 22 and 24 and supply lines 26, 28, and 30 such that by opening and closing specific combinations of the inverter switches, positive and negative DC voltage pulses are generated on each of lines 26, 28, and 30. By opening and closing the inverter switches in specific sequences, AC voltages having controllable amplitudes and frequencies can be generated on each of supply lines 26, 28, and 30.

Each of lines 26, 28, and 30 is linked to a separate one of three-phase windings (not separately numbered or illustrated) of motor 16. By providing known sequences of AC voltages across the motor windings, varying currents are caused therein which induce a rotating magnetic field within a motor stator core. A motor rotor (not illustrated) which is linked to a motor shaft 32 resides within the motor core. The rotor includes either bars or windings or both and, when the changing and rotating magnetic field within the stator core intersects the rotor, currents are induced within the rotor and the rotor currents in turn cause a rotor magnetic field within the stator core. The rotor field is attracted by the rotating stator field and hence the rotor rotates within the stator core. Load 18 is attached via shaft 32 to the rotor and therefore, when the rotor rotates, load 18 also tends to rotate in the same direction.

Inverter controller 20 is linked via control lines collectively referred to by numeral 40 to the inverter switches. Controller 20 includes a microprocessor 34 and a memory 36. Among other information, memory 36 includes a ramp-up algorithm and a DC link voltage limit DCL that is chosen to be between a high end of a brake hysteretic range and an inverter trip voltage $V_t$. For the purposes of the present explanation it will be assumed that the hysteretic brake range is between 735V and 750V and that the inverter trip voltage $V_t$ is 810V. In addition, the DC link limit DCL is assumed to be 770 volts. Microprocessor 34 uses the information in memory 36 to control the inverter switches thereby providing AC voltages on lines 26, 28, and 30 that have desired amplitudes and frequencies and that are phase shifted from each other such that they cause the intended stator core magnetic field.

Brake resistor 21 and switch 23 are linked in series between positive and negative DC buses 22 and 24, respectively. Switch 23 is usually a switching device such as a BJT or other power switching device and is controlled by brake controller 25. Resistor 21 is selected so that the resistor is capable of dissipating a steady state power value which will be described in more detail below. When switch 23 is closed, current from DC link 12 passes through resistor 21 and energy associated therewith is dissipated as heat. Brake controller 25 is programmed with the hysteretic brake range DCR (e.g., 735V to 750V) that is below the inverter trip voltage level (e.g., 810V) and is also below the DC link limit DCL (e.g., 770V).

A voltage sensor 42 (e.g., a Hall effect sensor) is linked to positive DC link 22 and provides a DC voltage level signal to each of inverter controller 20 and brake controller 25.

Brake controller 25 receives the voltage level signal from sensor 42 and compares the received voltage level to the DC link range DCR. When the received voltage level exceeds the upper limit of the DCR (e.g., 750V), controller 25 closes switch 23 to reduce the DC link voltage level. Controller 25 is hysteretic in that, once switch 23 is closed, controller 25 maintains switch 23 closed until the DC link voltage level drops below the lower limit of the DCR (e.g., 735V). Thereafter, switch 23 remains open until the DC link voltage again surpasses the upper limit of the DCR (e.g., 750V).

Interface 44 is linked to controller 20 to enable a system user or an enterprise controlling processor to control system 10 via commands. In the case of the present invention, among other commands, interface 44 can be used to provide a brake or speed reduction command.

Figure 2:
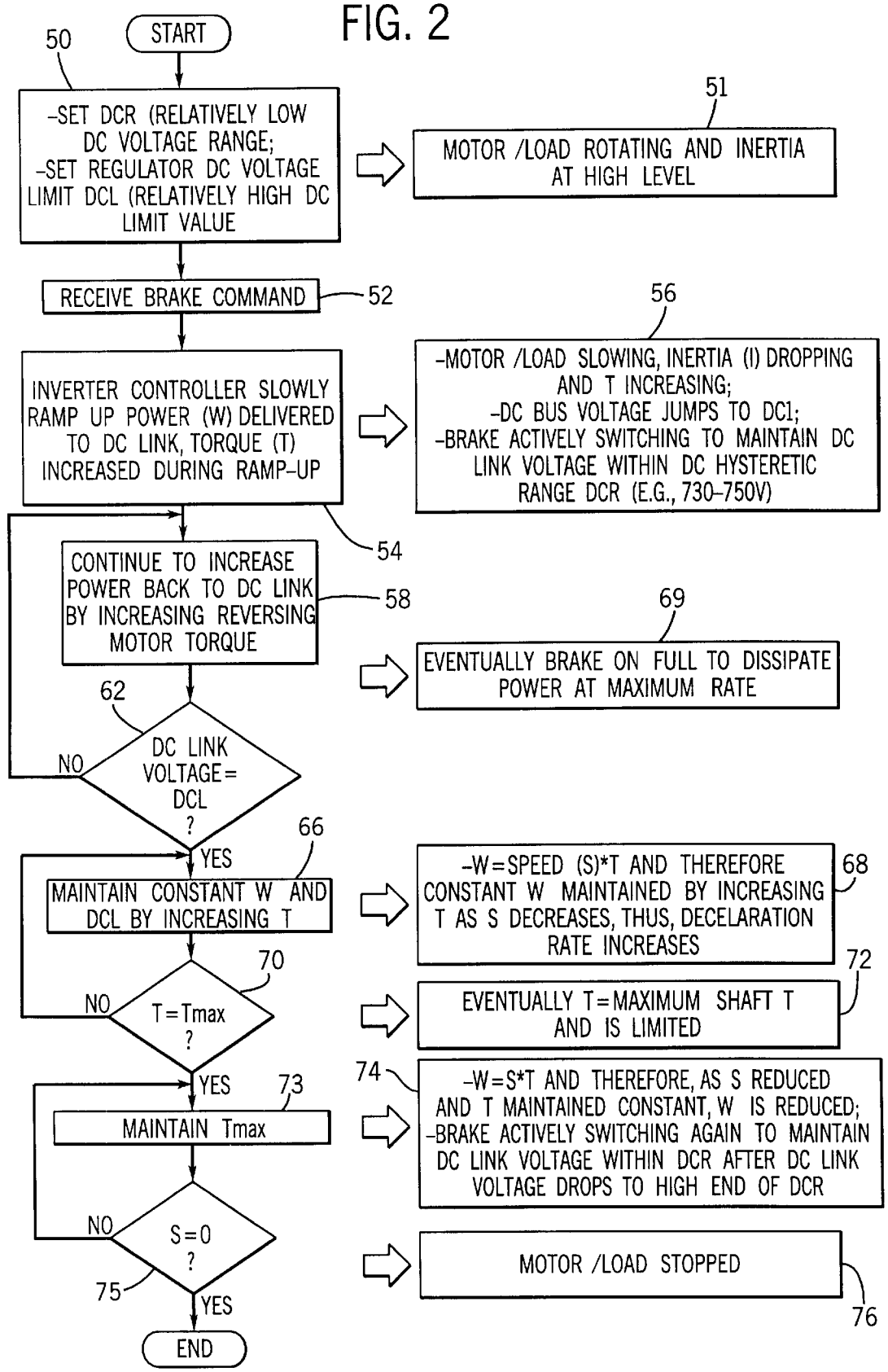
FIG. 2 is a flowchart and comments illustrating a method according to the present invention.

Referring now to FIGS. 1 and 2, in FIG. 2 a flowchart illustrating operation of inverter controller 25 and system 10 generally according to the inventive method is illustrated. To the right of the flowchart comment boxes (e.g., boxes 51, 56, 69, etc.) are provided indicating system operating characteristics during performance of the method.

Figure 3:
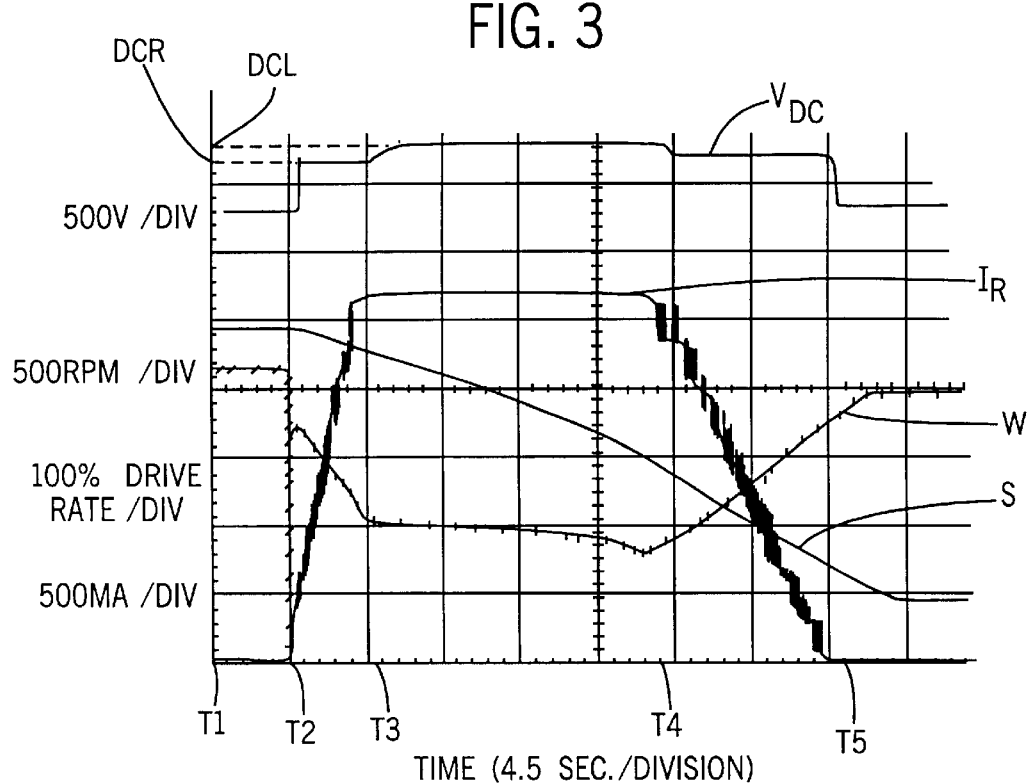
FIG. 3 is a graph illustrating various operating characteristics of the system of FIG. 1 during the method of FIG. 2 including DC bus voltage, brake current, motor speed, and motor power.

Referring also to FIG. 3, therein several graphs illustrating selected system operating characteristics over time are provided including DC bus voltage $V_{DC}$, motor speed S, motor power % W and brake current $I_R$. The time scale is approximately 4.5 seconds/div, the voltage scale is 500V/div, the speed scale is 500 RPM/div., the power scale is 100% drive rating/div and the brake current scale is 500 ma/div. FIG. 3 was generated via tests performed on a 3 horsepower 460V motor powered from a 5 HP 460V drive with a large inertia wheel coupled to the motor.

Referring still to FIGS. 1, 2 and 3, initially, as indicated in comment box 51, motor 16 and load 18 are being powered by inverter 14 to rotate in a forward direction at a steady state initial speed of approximately 2000 RPM at time TI. Also, initially, it is assumed that both the brake DC link range DCR and the inverter controller DC link limit DCL are set. Again, the exemplary trip voltage $V_t$ for inverter 14 is set at 810 volts, an exemplary brake range DCR is between 735V (brake range lower limit) and 750V (brake range upper limit) while the inverter DC link limit DCL is set to a relatively high 790 volts. In FIG. 2, the brake range DCR and limit DCL are set at process block 50.

At process block 52, at time T2 (ee FIG. 3), a break command is provided to inverter controller 20 via interface 44 commanding controller 20 to cause inverter 14 to rapidly stop motor 16 and load 18. When the brake command is received, at process block 54, controller 20 controls inverter 14 to provide a reversing or decelerating torque to motor 16 and slowly ramps up the torque so that power provided back through inverter 14 to DC link 12 increases slowly. This period (see FIG. 3 between times T2 and T3) during which power is increasing is referred to herein as a "power-up" period. As the reversing torque is applied to motor 16, the motor/load begin to slow and the inertia associated with the motor/load starts to drop as identified by comment box 56. In addition, as indicated in block 56 and in FIG. 3 at time T1, the DC bus voltage across link 12 almost immediately jumps to the brake range DCR and switch 23 is actively opened and closed to maintain the DC link voltage within the DCR hysteretic range (e.g., 735–750 V). Moreover, the decelerating torque causes power W delivered to the DC link to ramp negative and the brake resistor current $I_R$ increases steadily.

Referring still to FIGS. 1, 2 and 3, at block 58, controller 20 controls inverter 14 to continue to increase the power delivered back to DC link 12 by increasing the decelerating motor torque. Eventually, as the decelerating motor torque is increased the power delivered back to the DC bus reaches a level where, even with the brake switch closed and the resistor 21 "full-on," the resistor cannot dissipate enough power to maintain the DC link voltage below the upper limit (e.g., 750V) of the hysteretic brake range DCR. In FIG. 3 this "full-on" brake point corresponds to time T3 after which the DC link voltage $V_{DC}$ begins to rise above the upper limit of range DCR. In FIG. 2 this "full-on" brake point is indicated in box 69.

Continuing, at block 62, controller 20 monitors the DC link voltage $V_{DC}$ via sensor 42 and compares the DC link voltage $V_{DC}$ to the inverter link limit DCL. Where the DC link voltage $V_{DC}$ is less than the link limit DCL, control passes back up to block 58 where controller 20 continues to increase the decelerating torque on motor 16. When the DC link voltage $V_{DC}$ reaches link limit DCL, control passes to process block 66 where controller 20 continues to increase the torque in a fashion calculated to maintain constant power W and to maintain the DC link voltage $V_{DC}$ at the link limit DCL. This period (in FIG. 3 between times T3 and T4) is referred to herein as the "constant power" period. As indicated in comment block 68, the power delivered back to the DC link 12 is equal to the product of the motor speed S and the torque T applied to the motor and, therefore, constant power is maintained by increasing the torque T as the speed S decreases. For this reason, referring again to FIG. 3, the deceleration rate of the motor/load increases as illustrated by the shape of speed waveform S.

Continuing, at decision block 70, controller 20 determines whether or not the torque applied to motor 16 has reached a maximum torque level $T_{max}$ allowable given the motor and load configuration. This condition is indicated by comment box 72. If the applied torque is less than the maximum allowable torque, control passes back up to block 66 and the torque is increased at a rate calculated to maintain link voltage $V_{DC}$ at limit DCL. Where the applied torque T is equal to the maximum torque $T_{max}$, control passes to process block 73 where controller 20 maintains the applied torque T at the maximum value $T_{max}$. In FIG. 3 the applied torque T is equal to the maximum torque $T_{max}$ at time T4. As indicated by comment block 74, as the speed S is reduced and the torque T is maintained constant, the power W provided back to the DC link begins to drop. As the power back to link 12 drops, the DC link voltage $V_{DC}$ drops from the link limit DCL down to the value at the lower end of the brake range DCR (e.g., 735 volts). In FIG. 3, at a time just after time T4, switch 23 is again controlled to actively open and close thereby maintaining the DC link voltage within the brake range DCR (e.g., between 735 and 750 volts). Referring still to FIGS. 1, 2 and 3, at decision block 75, controller 20 continues to maintain the constant torque until the motor speed 5 is essentially zero (i.e., the motor has stopped) at time T5.

Referring to FIG. 3 the total braking cycle between times T2 and T5 required approximately 32 seconds including an approximately 4.5 second power up period between times T2 and T3, an approximately 16 second constant power/increasing torque period between times T3 and T4 and an 11.5 second reducing power or "power-down" period between times T4 and T5.

Two important operating characteristics illustrated in FIG. 3 should be recognized. First, because power W is slowly increased during the power-up period the braking resistor 21 (see FIG. 1) need only be sized such that the resistor 21 can dissipate energy associated with the steady state brake cycle power level instead of a peak initial power surge associated with most dynamic brake configurations.

Second, during the constant power period between times T3 and T4, because the brake voltage $V_{DC}$ is above the upper limit (e.g., 750V) of the DC link range DCR, the brake resistor is full-on during the entire period and therefore is fully utilized to dissipate energy. Full utilization means more rapid deceleration.

Figure 4:
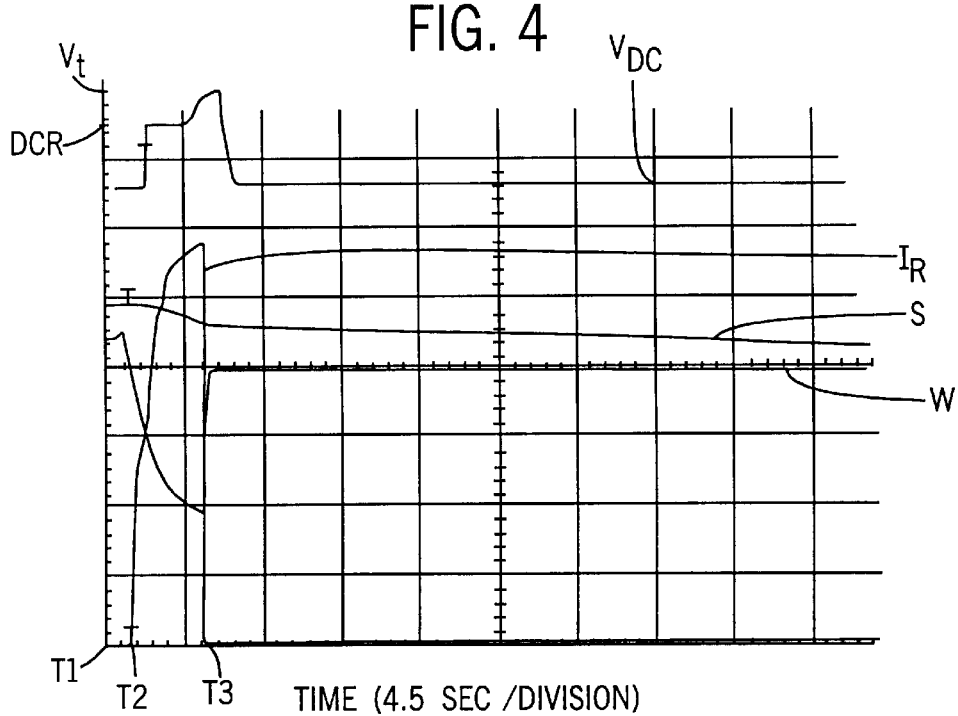
FIG. 4 is a graph similar to FIG. 3, albeit where the DC link limit DCL is turned off and the deceleration time is programmed to be 45 seconds such that the inverter trip mechanism trips.

Referring now to FIG. 4, four curves corresponding to DC link voltage $V_{DC}$, motor speed S, motor power % W and brake current IR that are similar to the curves of FIG. 3 are illustrated. In FIG. 4 the scales are the same as in FIG. 3 and the curves were generated using a similar drive, source and load configuration. In FIG. 4, however, the DC link limit DCL feature was disabled to illustrate the importance of the link limit DCL. In FIG. 4, with the DCL feature disabled and an initial speed of 2000 RPM at time T1, at time T2 a brake command is received commanding a deceleration or stop time of 45 seconds. Again, as described above, controller 20 causes inverter 14 to apply a slowly increasing decelerating torque to motor 16. The decelerating torque causes the DC link voltage $V_{DC}$ to jump to the brake range DCR, causes the brake current IR to ramp up and causes the power W to ramp up during a power-up period between times T2 and T3. Unfortunately, at time T3 the DC link voltage exceeds the trip voltage and hence the inverter disabling feature kicks in to protect the inverter switches. In FIG. 4, after the inverter disabling feature trips at time T3 the motor speed S drifts slowly lower. Thus, a 45 second stop time was too rapid given the operating conditions.

Figure 5:
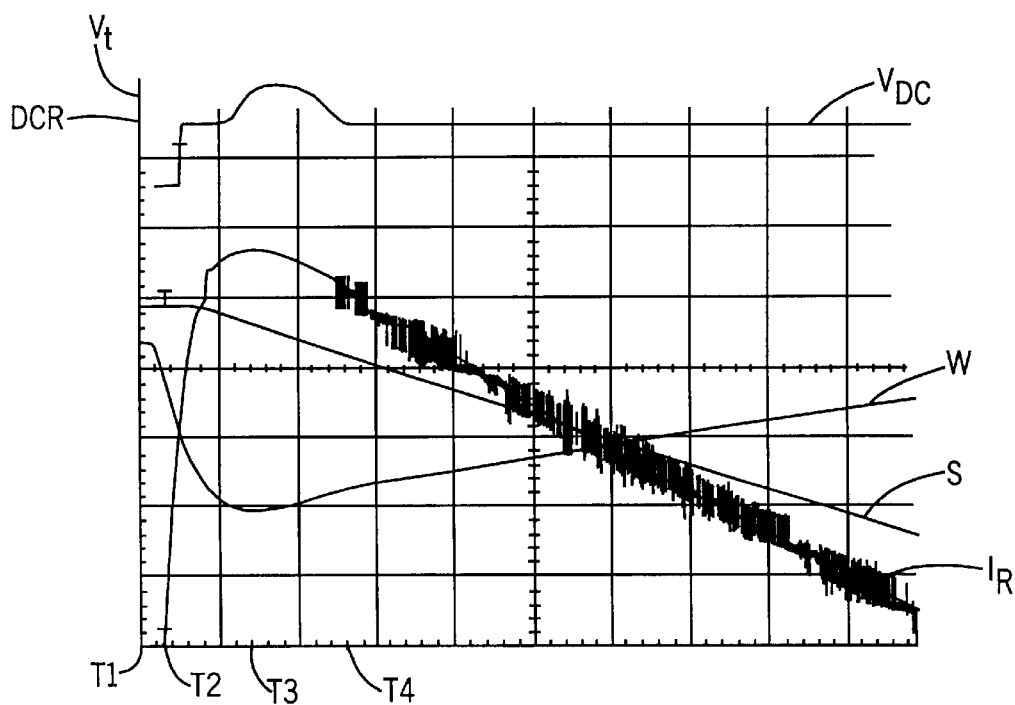
FIG. 5 is a graph similar to FIG. 4 where the DC link limit DCL is turned off but where the deceleration time is set to 46 seconds so that the inverter trip mechanism does not activate.

Referring now to FIGS. 3 and 5, FIG. 5 is similar to FIG. 3 in that DC link voltage $V_{DC}$, brake current $T_R$, motor speed 5 and power W curves are illustrated. In FIG. 5 the scales are the same as in FIG. 3 and the curves were generated using a similar drive, source and load configuration. As in FIG. 4, in FIG. 5 the DC link voltage limit DCL was disabled. However, in FIG. 5 the stop command allowed 46 seconds to stop the motor instead of 45. With the system configuration tested 46 seconds was the fastest time for stopping the motor without a DCL and without tripping the inverter disable feature. Again, in FIG. 5, at time T1 the initial motor speed was approximately 2000 RPM. At time T2 when the 46 second stop command was received, $V_{DC}$ increased to DCR, brake current $I_R$ began to ramp up, power W began to ramp up and motor speed S began to drop.

At time T3 the brake 21 became full-on while the power W continued to increase until time T3 when the DC link voltage $V_{DC}$ was just below the inverter disabling voltage $V_t$ (e.g., 810V). Between times T3 and T4 the power W delivered back to DC link 12 dropped. At time T4 the DC link voltage $V_{DC}$ again drops to within the hysteretic brake range DCR where the DC link voltage $V_{DC}$ remains essentially until the motor stops.

Comparing FIGS. 3 and 5 the advantages of the present invention become apparent. Clearly the stopping time using the invention manifest in FIG. 3 requires a shorter stopping period (e.g., 32 sec.) than a similar system without the invention (e.g., 46 sec.). Also, because of the power-up period provided for by the invention, brake resistor size and cost is reduced. Moreover, the RPL commissioning procedure can be avoided using the present invention.

It should be understood that the methods and apparatuses described above are only exemplary and do not limit the scope of the invention, and that various modifications could be made by those skilled in the art that would fall under the scope of the invention. For example, while the invention has been described as one wherein the link limit DCL is a single value between the brake range upper limit and the inverter trip value $V_t$, the limit may in fact be a full-on range in which the brake remains fully on. For instance, by maintaining the DC link voltage between the brake range upper limit and the trip value the brake remains full-on.

In addition, the link limit DCL (or full-on range for that matter) may be between the brake range lower and upper limit values. For example, if the hysteretic brake range is 735V–750V, the DCL may be set to 745V so that, after the upper limit 750V has been achieved and once the power delivered back to the DC link is sufficient to maintain the DC link voltage at 745, the link voltage may be limited to the 745V value. Once again, when the link voltage is so limited, the brake 21 will remain full-on and power is dissipated expeditiously.

Moreover, although the invention is described above as involving "linear deceleration", other deceleration profiles are common and the inventive method would be very useful in non-linear deceleration applications as well. For example, "S curve" deceleration is common and at times is useful where overvoltage occurs during decelerations. Additionally, while described in the context of an exemplary "ramp start", other controlled starting sequences are also contemplated as there are many different ways to start the braking cycle. Also, although a stop is used in the example described above, the invention applies to any deceleration that regenerates.

Furthermore, although the invention is described in the context of an exemplary application, the invention may be used with many different kinds of motors (e.g. induction, PM, DC, brushless, etc.).

Moreover, the invention is also applicable in other than braking applications. For example a line regenerative supply that cannot regenerate to the same capacity as a drive linked thereto would result in a drive overvoltage trip. Using the inventive concepts described above in this application could automatically compensate to maintain drive operation. Use of the inventive concepts with other limited power regenerative applications are also contemplated.

To apprise the public of the scope of this invention, the following claims are made:

What is claimed is:

1. An apparatus for use with an inverter characterized by an inverter trip voltage Vt, a DC link having positive and negative buses, a load and a dynamic brake including a resistor in series with a switch and a brake controller for opening and closing the switch, the brake controller closing the switch when the DC link voltage is greater than a brake range upper limit and, once the switch is closed, maintaining the switch closed until the DC link voltage drops below a brake range lower limit, the DC source linked to the load through the inverter, the dynamic brake linked between the DC buses, the apparatus for controlling the inverter during braking and comprising:

an inverter controller for controlling the inverter such that:
when a brake command is received, the power into the brake is increased over a power-up period until the DC link voltage exceeds the range upper limit and the power is sufficient to maintain the DC link voltage within a full-on range between the brake range lower limit and the trip voltage Vt; and
after the power-up period, the power into the brake is maintained such that the DC link voltage stays within the full-on range during a constant power period.

2. The apparatus of claim 1 wherein the full-on range is between the brake range upper limit and the trip voltage Vt.

3. The apparatus of claim 1 wherein the full-on range is a DC link limit DCL value.

4. The apparatus of claim 3 wherein the DC link limit is greater than the brake range upper limit.

5. The apparatus of claim 4 wherein the brake range upper limit is essentially 750 volts, the trip voltage is essentially 810 volts and the link limit DCL is between 760 and 800 volts.

6. The apparatus of claim 5 wherein the link limit DCL is essentially 790 volts.

7. The apparatus of claim 1 wherein, during the constant power period, as load speed decreases, the inverter controller increases torque to increase deceleration rate and to maintain essentially constant power delivered back to the DC link.

8. The apparatus of claim 7 wherein the load is characterized by a maximum torque value and, after the maximum torque value is reached the inverter controller maintains the torque at the maximum torque value during a power-down period following the constant power period.

9. The apparatus of claim 1 further including a DC link voltage sensor for sensing DC link voltage, the sensor linked to each of the brake and the inverter controllers and providing a voltage signal indicating DC voltage.

10. An method for use with an inverter characterized by an inverter trip voltage Vt, a DC link having positive and negative buses, a load and a dynamic brake including a resistor in series with a switch and a brake controller for opening and closing the switch, the brake controller closing the switch when the DC link voltage is greater than a brake range upper limit and, once the switch is closed, maintaining the switch closed until the DC link voltage drops below a brake range lower limit, the DC source linked to the load through the inverter, the dynamic brake linked between the DC buses, the method for controlling the inverter during braking and comprising the steps of:

when a brake command is received, causing the inverter to increase the power into the brake over a power-up period until the DC link voltage exceeds the brake range upper limit and the power is sufficient to maintain the DC link voltage to be within a full-on range between the brake range lower limit and the trip voltage Vt; and after the power-up period, maintaining the power into the brake such that the DC link voltage is maintained within the full-on range during a constant power period.

11. The method of claim 10 wherein the full-on range is between the brake range upper limit and the trip voltage Vt.

12. The method of claim 10 wherein the full-on range is a DC link limit DCL value.

13. The method of claim 12 wherein the DC link limit is greater than the brake range upper limit.

14. The method of claim 13 wherein the brake range upper limit is essentially 750 volts, the trip voltage is essentially 810 volts and the link limit DCL is between 760 and 800 volts.

15. The method of claim 14 wherein the link limit DCL is essentially 790 volts.

16. The method of claim 10 wherein, during the constant power period, as load speed decreases, the step of maintaining includes increasing torque to increase deceleration rate.

17. The method of claim 16 wherein the load is characterized by a maximum torque value and the method further includes the step of, after the maximum torque value is reached, maintaining the torque at the maximum torque value during a power-down period following the constant power period.

18. An apparatus for use with an inverter characterized by an inverter trip voltage Vt, a DC link having positive and negative buses and a load, the DC source linked to the load through the inverter, the dynamic brake linked between the DC buses, the apparatus for controlling the inverter during braking and comprising:

a dynamic brake including a resistor in series with a switch linked between the positive and negative DC buses;

a brake controller for opening and closing the switch, the brake controller closing the switch when the DC link voltage is greater than a brake range upper limit and, once the switch is closed, maintaining the switch closed until the DC link voltage drops below a brake range lower limit, an inverter controller for controlling the inverter such that:

when a brake command is received, the power into the brake is increased over a power-up period until the DC link voltage exceeds the range upper limit and the power is sufficient to maintain the DC link voltage within a full-on range between the brake range lower limit and the trip voltage Vt; and after the power-up period, the power into the brake is maintained such that the DC link voltage stays within the full-on range during a constant power period.

19. The apparatus of claim 18 wherein the full-on range is between the brake range upper limit and the trip voltage Vt.

20. The apparatus of claim 18 wherein the full-on range is a DC link limit DCL value.

21. The apparatus of claim 20 wherein the DC link limit is greater than the brake range upper limit.

* * * * *

UNITED STATES PATENT AND TRADEMARK OFFICE
CERTIFICATE OF CORRECTION

PATENT NO.     : 6,577,483 B1                                                Page 1 of 1
DATED          : June 10, 2003
INVENTOR(S)    : John T. Streicher It is certified that error appears in the above-identified patent and that said Letters Patent is hereby corrected as shown below:

<u>Title page,</u>
Items [12] and [75], the name of the primary inventor as it appears "Steicher" should be -- Streicher --.

Signed and Sealed this

Thirtieth Day of December, 2003

JAMES E. ROGAN
*Director of the United States Patent and Trademark Office*